Aug. 30, 1927.
A. C. BROWN
1,640,527
FAUCET
Filed April 18, 1925
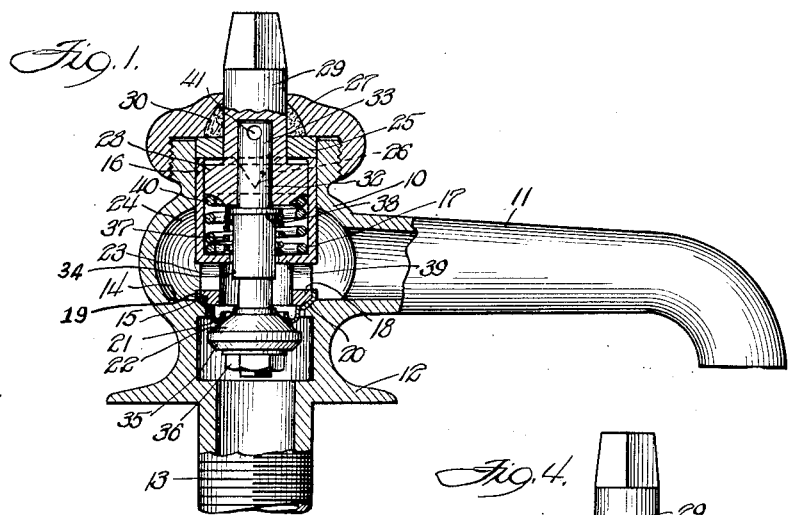
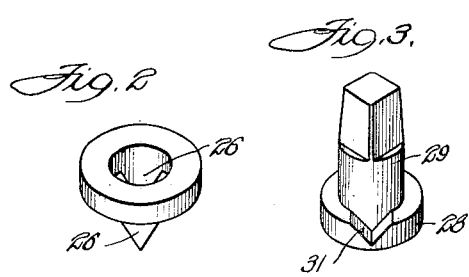
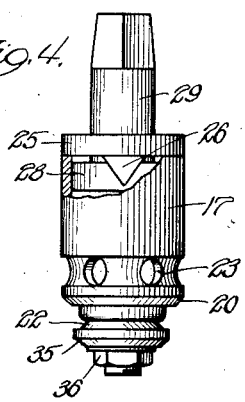
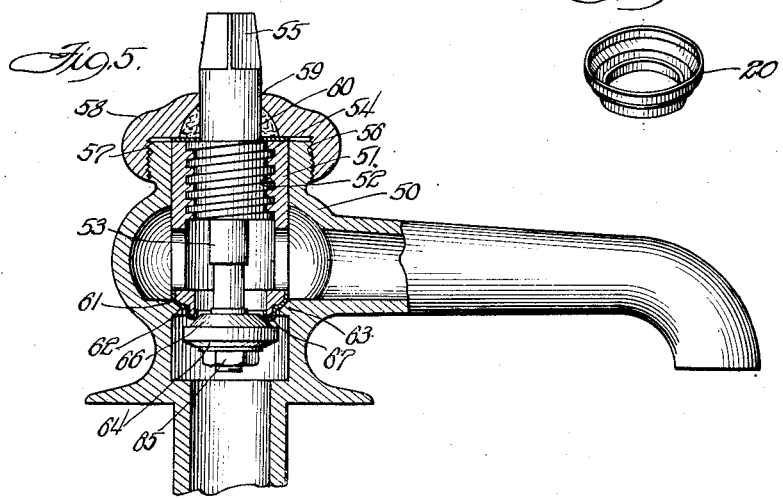
Inventor:
Albert C. Brown
Chas P. Soper Atty.
Witness:
W. T. Olson Patented Aug. 30, 1927.

1,640,527

UNITED STATES PATENT OFFICE.

ALBERT C. BROWN, OF CHICAGO, ILLINOIS.

FAUCET.

Application filed April 18, 1925. Serial No. 24,024.

My invention relates to faucets such as are employed in connection with sinks, lavatories, tubs, and the like and particularly to a faucet in which the movable parts are arranged as a unit which may be readily removed from the faucet body, the removable parts of the various faucets of one type being all alike so that in case a faucet becomes defective, a unit carrying the movable parts of the faucet may be removed and a similar unit installed in place thereof.

The principal object of the present invention is the provision, in a faucet having a removable unit as above described, of a removable valve seat which may be readily removed from the unit and another one substituted therefor.

The present application is a continuation in part of applicant's prior application, Serial No. 506,087, filed Oct. 7th, 1921.

In the present embodiment of the invention the removable seat is stamped from sheet metal which provides a cheap and satisfactory article, although it is to be understood that it may be formed in any other desired manner.

In faucet structures such as that herein disclosed, it is found that when the washer becomes defective and the water flows through between the washer and the valve seat for a considerable length of time, the valve seat becomes scored so that difficulty is experienced in making the valve shut off, even after a new washer is put on. With many of the older faucets it becomes necessary to throw away the entire faucet and replace it with a new one due to the fact that the faucet was made inoperative by the scoring of the valve seat.

In order to overcome this defect, certain structures having removable valve seats were designed such as shown in applicant's prior Patent No. 1,148,441, granted July 27th, 1915. In the structure of this earlier patent however, the valve seat was formed as a part of the removable collar of the unit and thus the seat could not be replaced without replacing the entire unit or at least disassembling the entire unit and employing a new collar.

With the removable valve seat of the present invention, the valve seat may be readily slipped off and a new one slipped on in the place of it. As a matter of fact with applicant's new structure, the valve seat may be replaced by a new one as readily as the washer can be replaced. Thus in applicant's present structure, the removable unit may be taken out, a new washer inserted on the stem and a new valve seat on the collar thus providing for all intents and purposes a new valve on the faucet with immaterial outlay for parts and labor.

A further advantage of making the valve seat separate is that the valve seat may be made of a superior relatively expensive material as phosphorbronze while the sleeve can be made of a cheaper metal as brass.

Referring now to the drawings—

Figure 1 is a section through one modification of applicant's invention,

Figure 2 shows a cam operating member of the valve removed from the valve casing, Figure 3 is a perspective view of the rotatable cam member of the valve operating device.

Figure 4 shows the complete removable unit of the faucet removed from the casing, Figure 5 is a vertical section through a modified form of the faucet; and

Figure 6 is a perspective view of the removable valve seat detached.

In the drawings, in which like reference characters indicate like parts in the several views, 10 indicates the valve casing having the nozzle 11 extending therefrom. The valve casing 10 is provided with a base 12 adapted to be secured to the tub or other device in the usual manner. Extending downwardly from the base 12 is a threaded pipe 13, which communicates with the water or other system. Intermediate the top and bottom the casing 10 is provided with a diaphragm 14, having an opening through the center thereof through which the water or other fluid may pass. The upper edge of the diaphragm 14 is beveled as indicated at 15.

A cylindrical opening 16 is provided in the casing 10 within which is positioned the sleeve 17 of the removable unit. The sleeve 17 adjacent to the lower end thereof is inwardly offset as indicated at 18. About the offset portion 18 is positioned the upper end 19 of the removable sheet metal valve seat 20. The end 19 of the valve seat is substantially cylindrical in order to conform to the reduced portion 18 of the sleeve 17. It then converges downwardly and inwardly and preferably terminates in a bent portion 21, which forms a rounded edge or a valve seat against which the valve washer or gasket 22 may engage as subsequently described.

The sleeve 17 is provided with the lateral openings 23 through which the water passes to the chamber 24 surrounding the sleeve 17 and with which the bore of the nozzle 11 communicates.

Within the cylindrical opening 16 in the casing 10 and above the sleeve 17 is an annular member 25 having at the opposite sides thereof the downwardly extending tapered lugs or cams 26. The upper end of the casing 10 is externally screw threaded to receive the internal threads on the cap member 27 which, when screwed down, forces the annular member 25 and the sleeve 17 downwardly causing the converging portion of the removable valve seat to snugly engage the beveled edge 15 of the casing diaphragm 14.

Positioned within the sleeve 17 is the cylindrical block 28 provided with valve operating stem 29 which extends outwardly through the openings in the annular member 25 and cap 27, packing material 30 being provided within the cap about the stem 29. The block 28 is provided in the upper surface thereof with a pair of V-shaped notches 31, adapted when the valve is in normal closed position, to receive the cam lugs 26 of the annular member 25.

The block 28 and stem 29 are centrally bored as indicated at 32 to receive the upper reduced end 33 of a secondary valve stem or valve plunger 34. The valve washer 22 is secured on the reduced lower end of the plunger 34 by means of the cup shaped retaining washer 35 and nut 36.

Within the sleeve 17 about the plunger 34 is a coil compression spring 37, one end of which engages the flange 38 on the plunger 34 and the other end engages the inwardly extending flange 39 on the sleeve 17. This spring 37 tends to return the valve washer 22 into engagement with the valve seat 21 whenever the valve is opened.

Positioned within the sleeve 17 about spring 37, is a second heavier compression spring 40, one end of which engages the inwardly directed portion 39 of sleeve 17, the other end being in engagement with block 28. Spring 40 tends to return block 28 to its uppermost position whenever it is depressed.

The operation of the faucet shown in Figs. 1 to 4 is as follows:

Due to the fact that the cap member 27 firmly engages the annular member 25, the member 25 is held stationary, thus when the stem 29 is rotated by the usual handle, the notches 31 in the block 28 are displaced in relation to the downwardly extending lugs 26 on the member 25 and the block 28 is forced downwardly, striking the shoulder at 38 on the stem 34 and forcing the valve washer 22 off from seat 21. It will be understood that the springs 37 and 40 are both compressed by this operation. As soon as the valve operating handle is released, the spring 40 forces the valve block 28 upwardly into its normal position. At the same time, the spring 37 tends to move the plunger 34 upwardly, this movement being assisted by the pressure of the water in the stem.

Referring now to Fig. 5, which shows a modified form of spigot, the casing 50 is substantially identical with the casing 10 of Fig. 1. Within the casing 50 is a sleeve 51. The sleeve 51 adjacent to the upper end thereof is internally screw-threaded as shown at 52. Within the screw threaded portion of the sleeve 51 is an operating plunger 53, provided with threads 54 adapted to co-operate with the screw threaded portion 52 of sleeve 51. The upper end of the plunger or stem 53 is squared as shown at 55, in order that the usual handle may be secured thereto in the well known manner.

The upper end of the casing or body 50 is externally screw threaded as shown at 56. Co-operating with the threads 56 are the internal threads 57 on the cap member 58. The cap member is provided with the opening 59 through which the stem 53 passes, packing material 60 being provided about the stem 53 to prevent water passing upwardly through the cap member. It will be noticed that the cap member 58 overlies the upper end of the sleeve 51 and consequently when the cap member 58 is screwed down into place the sleeve 51 is forced downwardly, thus bringing the tapered portion 61 of the removable valve seat firmly into engagement with the beveled portion 62 of the diaphragm 63, thus providing a water tight connection between the bevel side of the removable valve seat and the diaphragm.

Secured to the lower end of the plunger 53 by means of the cupped washer 64 and nut 65 is the valve washer or gasket 66. The valve washer 66 is brought into and out of engagement with the valve seat 67 by longitudinal displacement of plunger 53, caused by the interaction of the screw threads 52 and 54 upon rotation of the plunger.

From an inspection of Figure 1, it will now be evident that if the faucet becomes defective, by simply unscrewing the cap 27, the movable element carried by the sleeve 17 may be moved out of position. Then by removing the nut 36 and removing the valve washer, a new valve seat may be readily placed in position and a new washer placed upon the valve stem. To assist in removal of the nut 36, it may be found desirable to remove the end 33 of the plunger from the bore 32 and place a nail or like device through the hole 41 to prevent the plunger rotating with the nut.

This arrangement not only permits the change of parts to be quickly and easily made, but provides a replaceable valve seat, which in the preferred embodiment may be stamped from sheet metal, thus being exceedingly cheap and permitting the valve seats to be furnished of good material at a price only slightly in excess of the cost of the valve washers.

It will be readily seen that the valve seat and washer of the form of the device shown in Figure 5, are removable just as readily as in the form shown in Figure 1.

While in the drawings and in the above description the removable seat has been shown and described as formed of sheet metal, it is to be understood that applicant contemplates forming this seat in other ways, as by machining, also other modifications in the details of the invention are contemplated. The invention should therefore be limited merely by the scope of the appended claims.

Having thus described my invention what I claim as new and desire to secure by Letters Patent of the United States is:

1. A faucet, comprising, a body, a seat in said body, a sheet metal valve seat adapted to seat against said first-mentioned seat, means carrying said sheet metal valve seat and adapted for securing said seat in assembled relation, and a gasket adapted to seat against said valve seat to control the flow of fluid through said valve.

2. A faucet, comprising, a body, a sleeve within the body, a sheet metal valve seat detachably mounted on said sleeve, a diaphragm within said body, a seat on said diaphragm, means for moving said sleeve longitudinally to force said detachable valve seat against said diaphragm seat, a valve washer and means carried by said sleeve for actuating said washer into and out of engagement with said detachable valve seat.

3. A faucet including in combination with the body thereof a removable valve unit structure comprising, a sleeve within the valve body, a sheet metal valve seat detachably mounted on said sleeve, a diaphragm within said valve body, a seat on said diaphragm, a cap engaging said sleeve arranged to move said sleeve longitudinally to force said detachable valve seat against said diaphragm seat, a valve washer and means carried by said sleeve for actuating said washer into and out of engagement with said detachable valve seat.

4. A faucet including in combination with the body thereof a removable valve unit structure comprising, a sleeve within the valve body, a metal valve seat frictionally secured to one end of said sleeve, a diaphragm within said body having an opening therethrough, a seat on said diaphragm adjacent to said opening, a cap for engagement with said sleeve and arranged to move said sleeve longitudinally to force said valve seat firmly against said diaphragm seat, a valve washer and means for actuating said washer carried by said sleeve.

5. A faucet including in combination with the body thereof a removable valve unit structure comprising, a sleeve having a reduced portion at the end thereof within the valve body, a sheet metal valve seat having an annular portion frictionally secured about the reduced portion of said sleeve, a diaphragm within said body having an opening therethrough, a seat on said diaphragm adjacent to said opening, a cap for engagement with said sleeve and arranged to move said sleeve longitudinally to force said valve seat firmly against said diaphragm seat, a valve washer and means for actuating said washer carried by said sleeve.

6. A faucet including in combination with the body thereof a removable valve unit structure comprising, a sleeve within the valve body, a sheet metal valve seat frictionally secured to one end of said sleeve, a diaphragm within said body having an opening therethrough, a beveled seat on said diaphragm adjacent to said opening, a tapered portion on said valve seat, a cap for engagement with said sleeve and arranged to move said sleeve longitudinally to force the tapered portion of said valve seat firmly against said beveled diaphragm seat, a valve washer and means for actuating said washer carried by said sleeve.

7. A faucet including in combination with the body thereof a removable valve unit structure comprising, a sleeve having a reduced portion at the end thereof within the valve body, a sheet metal valve seat having an annular portion frictionally secured about the reduced portion of said sleeve, a diaphragm within said body having an opening therethrough, a beveled seat on said diaphragm adjacent to said opening, a tapered portion on said valve seat, a cap for engagement with said sleeve and arranged to move said sleeve longitudinally to force the tapered portion of said valve seat firmly against said beveled diaphragm seat, a valve washer and means for actuating said washer carried by said sleeve.

In testimony whereof I have signed this specification.

ALBERT C. BROWN.